(12) United States Patent
Matsushita et al.

(10) Patent No.: US 10,353,954 B2
(45) Date of Patent: Jul. 16, 2019

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventors: Masahiro Matsushita, Yokohama (JP); Hirotaka Shiiyama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/260,822

(22) Filed: Sep. 9, 2016

(65) Prior Publication Data
US 2017/0075993 A1 Mar. 16, 2017

(30) Foreign Application Priority Data

Sep. 11, 2015 (JP) ................................. 2015-180116
Jul. 22, 2016 (JP) ................................. 2016-144757

(51) Int. Cl.
*G06K 9/46* (2006.01)
*G06K 9/62* (2006.01)
(Continued)

(52) U.S. Cl.
CPC ....... *G06F 16/784* (2019.01); *G06K 9/00335* (2013.01); *G06K 9/00362* (2013.01);
(Continued)

(58) Field of Classification Search
None
See application file for complete search history.

(56) References Cited

U.S. PATENT DOCUMENTS 8,103,149 B2 * 1/2012 Kagawa ............... G11B 27/105
386/261
8,335,354 B2 * 12/2012 Matsuo ............. G06F 17/30265
382/118
(Continued)

FOREIGN PATENT DOCUMENTS

JP   2002-373332 A   12/2002
JP   2013-153304 A   8/2013
WO   2013/118450 A1  8/2013

OTHER PUBLICATIONS

Extended European Search Report issued in corresponding application No. 16001820.6 dated Feb. 14, 2017.
(Continued)

*Primary Examiner* — Nancy Bitar
(74) *Attorney, Agent, or Firm* — Carter, DeLuca & Farrell LLP

(57) ABSTRACT

This invention prevents a collation database from becoming bulky and shortening the delay time needed from person detection to registration in the collation database. An information processing apparatus comprises an acquiring unit which acquires a video, a detecting unit which detects a whole body or a part of a person from at least one frame of the acquired video, a tracking unit which tracks the whole body or the part of the person detected, and a registering unit which registers, in a database, a feature amount extracted from the whole body or the part of the person tracked during a first period from a timing of a start of tracking of the whole body or the part of the person by the tracking unit to a timing before an end of the tracking by the tracking unit.

10 Claims, 9 Drawing Sheets

(51) Int. Cl.
*G06T 7/70* (2017.01)
*G06K 9/00* (2006.01)
*G06F 16/783* (2019.01)

(52) U.S. Cl.
CPC ..... *G06K 9/00771* (2013.01); *G06K 9/00993* (2013.01); *G06K 9/4604* (2013.01); *G06K 9/6267* (2013.01); *G06T 7/70* (2017.01)

(56) References Cited

U.S. PATENT DOCUMENTS

| | | | |
|---|---|---|---|
| 9,071,806 B2* | 6/2015 | Matsuyama | G11B 27/105 |
| 9,275,309 B2* | 3/2016 | Iliadis | G06K 9/66 |
| 2003/0059750 A1* | 3/2003 | Bindler | G06Q 10/10 |
| | | | 434/236 |
| 2007/0276270 A1* | 11/2007 | Tran | A61B 5/0022 |
| | | | 600/508 |
| 2008/0044085 A1* | 2/2008 | Yamamoto | G06K 9/00711 |
| | | | 382/190 |
| 2009/0324086 A1 | 12/2009 | Tojo et al. | |
| 2010/0014835 A1 | 1/2010 | Matsuyama | |
| 2013/0129160 A1* | 5/2013 | Yamada | G06K 9/00268 |
| | | | 382/118 |
| 2015/0030260 A1* | 1/2015 | Arikuma | G06T 7/00 |
| | | | 382/309 |
| 2015/0110372 A1* | 4/2015 | Solanki | G06T 7/0014 |
| | | | 382/130 |
| 2017/0039419 A1 | 2/2017 | Shiiyama et al. | |
| 2017/0075993 A1* | 3/2017 | Matsushita | G06F 17/30793 |

OTHER PUBLICATIONS

Murphy-Chutorian et al., "Head Pose Estimation for Driver Assistance Systems: A Robust Algorithm and Experimental Evaluation", in Proceedings of the IEEE Intelligent Transportation Systems Conference, Seattle, WA, 2007, pp. 709-714.

* cited by examiner

FACE DIRECTION PATTERN NUMBER

| 24 | 25 | 10 | 11 | 12 |
|----|----|----|----|----|
| 23 | 9  | 2  | 3  | 13 |
| 22 | 8  | 1  | 4  | 14 |
| 21 | 7  | 6  | 5  | 15 |
| 20 | 19 | 18 | 17 | 16 |

| OBJECT ID | FEATURE AMOUNTS (FOUR) | CAMERA ID | FRAME NUMBER, POSITION, SIZE |
|---|---|---|---|
| 00001 | XXXXXXX | 1 | XXXXXXXXX |
| 00002 | XXXXXXX | 1 | XXXXXXXXX |
| 00003 | XXXXXXX | 2 | XXXXXXXXX |
| ⋮ | ⋮ | ⋮ | ⋮ |

INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus for collating a person in an image, a method of controlling the same, and a storage medium.

Description of the Related Art

There is conventionally known an apparatus that detects the whole body or a part (for example, a face) of a human from each frame of a monitor video, calculates an image feature amount from the face, and stores it in association with the frames of the video. For example, an apparatus disclosed in Japanese Patent Laid-Open No. 2013-153304 (to be referred to as literature 1 hereinafter) can collate the face of a missing child as a query with stored image feature amounts and display a video including the child.

In the technique of literature 1, however, all faces detected from all frames of a video are registered in a database, and an enormous number of image feature amounts are stored. The frames may be thinned out to lower the frame rate of processing and decrease the number of image feature amounts of faces to be registered. In this case, the feature amounts of faces with preferable directions, sizes, eye capturing conditions, and the like may be unregistered, resulting in a collation failure.

SUMMARY OF THE INVENTION

The present invention has been made in consideration of the above problem. The present invention provides a technique of reducing the delay time needed until a feature amount extracted from the whole body or a part of a person is registered in a collation database.

According to an aspect of the invention, there is provided an information processing apparatus comprising: an acquiring unit configured to acquire a video; a detecting unit configured to detect a whole body or a part of a person from at least one frame of the acquired video; a tracking unit configured to track the whole body or the part of the person detected; and a registering unit configured to register, in a database, a feature amount extracted from the whole body or the part of the person tracked during a first period from a timing of a start of tracking of the whole body or the part of the person by the tracking unit to a timing before an end of the tracking by the tracking unit.

According to another aspect of the invention, there is provided a method of controlling an information processing apparatus, comprising: acquiring a video; detecting a whole body or a part of a person from at least one frame of the acquired video; tracking the whole body or the part of the person detected; and registering, in a database, a feature amount extracted from the whole body or the part of the person tracked during a first period from a timing of a start of tracking of the whole body and the part of the person to a timing before an end of the tracking.

According to the present invention, it is possible to reduce the delay time needed from detection of a person to registration of a feature amount extracted from the whole body or a part of the person in a collation database.

Further features of the present invention will become apparent from the following description of exemplary embodiments (with reference to the attached drawings).

DESCRIPTION OF THE EMBODIMENTS

The embodiments of the present invention will now be described with reference to the accompanying drawings. Note that the embodiments to be described below are examples of detailed implementation of the present invention or detailed examples of the arrangement described in the appended claims.

First Embodiment

Figure 1:
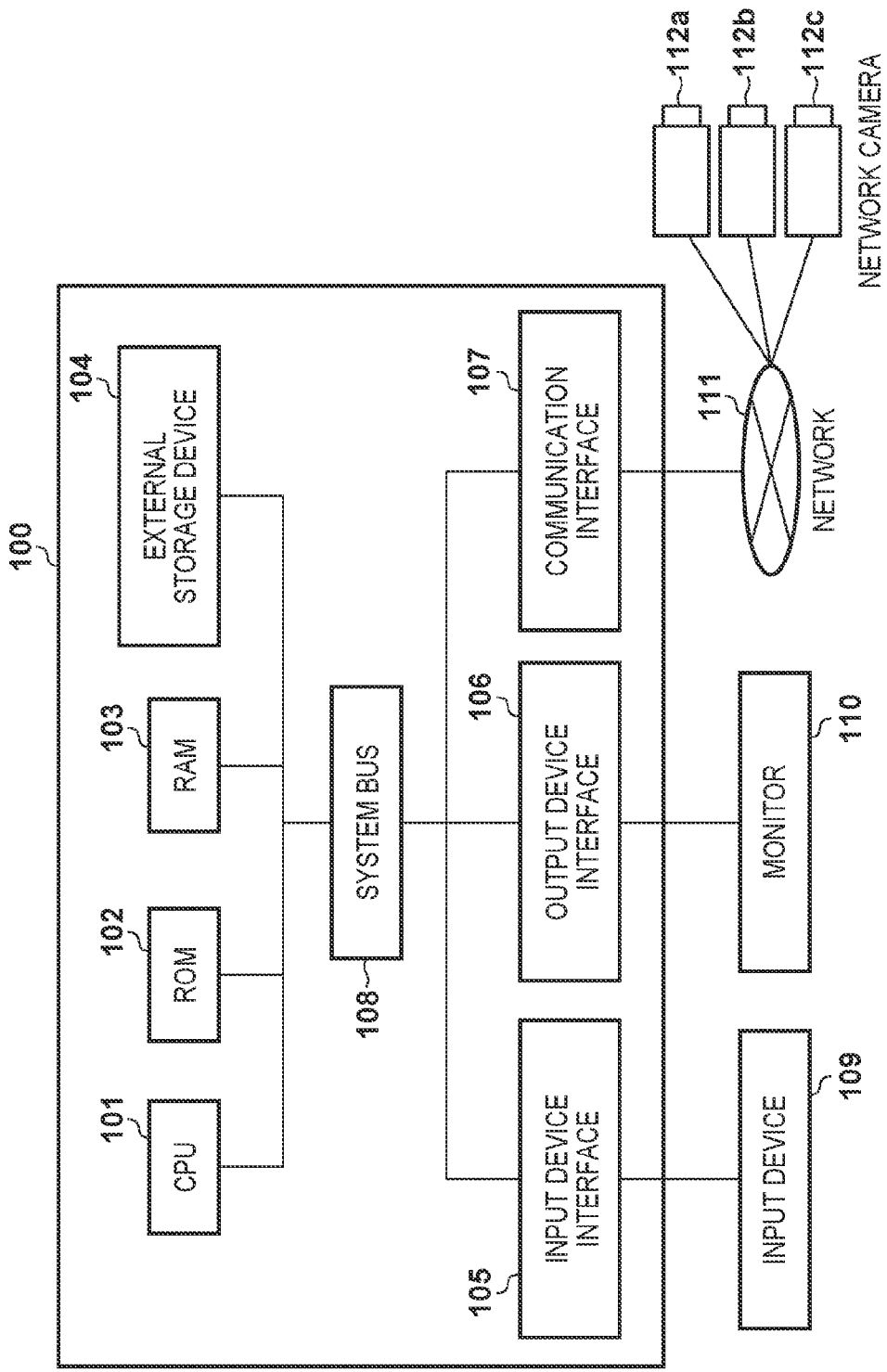
FIG. 1 is a block diagram of an apparatus according to an embodiment.

FIG. 1 is a block diagram of an image collation apparatus 100 according to this embodiment. The apparatus 100 will be described as an apparatus functioning as both a server apparatus for an image search and a client apparatus. However, the server function and the client function may be formed by independent apparatuses. The server apparatus need not be implemented by a single apparatus, and processing may be distributed to a plurality of computer apparatuses. When the server apparatus is constituted by a plurality of computer apparatuses, they are connected by a local area network (LAN) so as to communicate with each other. Each computer apparatus can be implemented by an information processing apparatus such as a personal computer (PC) or a workstation (WS).

Referring to FIG. 1, a CPU 101 is a central processing unit that controls the entire image collation apparatus 100. A ROM 102 is a read only memory that stores a program (for example, a BIOS) that does not require a change or parameters. A RAM 103 is a random access memory that temporarily stores a program or data supplied from an external apparatus or the like. An external storage device 104 is a mass storage device such as a hard disk permanently placed in the computer apparatus 100. The external storage device 104 stores the operating system (OS) of the apparatus, an application associated with image collation, and a collation database (to be referred to as a collation DB hereinafter) to be referred to upon collation. Video data captured by a video camera is also stored in the external storage device 104, as will be described later.

An input device interface 105 is an interface for an input device 109 such as a pointing device or keyboard that receives a user operation and inputs data. An output device interface 106 is an interface to a monitor 110 configured to display data held by the computer apparatus 100 or supplied data. A communication interface 107 is a communication interface configured to connect the apparatus to a network 111 such as the Internet. Network cameras 112a to 112c are connected to the network 111. Note that a camera ID is assigned to each of the network cameras 112a to 112c. A description will be made here assuming that camera IDs 1, 2, and 3 are assigned to the network cameras 112a, 112b, and 112c, respectively. At least one network camera suffices, and any number of network cameras may be connected. A system bus 108 is a transmission line that communicably connects the above-described units 101 to 107.

In the above arrangement, when the apparatus is powered on, the CPU 101 executes the BIOS program stored in the ROM 102, loads the OS (Operating System) from the external storage device 104 to the RAM 103, and executes the OS. As a result, the apparatus functions as an information processing apparatus. Under the control of the OS, a server program and a client program associated with image collation are executed from the external storage device 104. The apparatus thus functions as an image collation apparatus.

Figure 2:
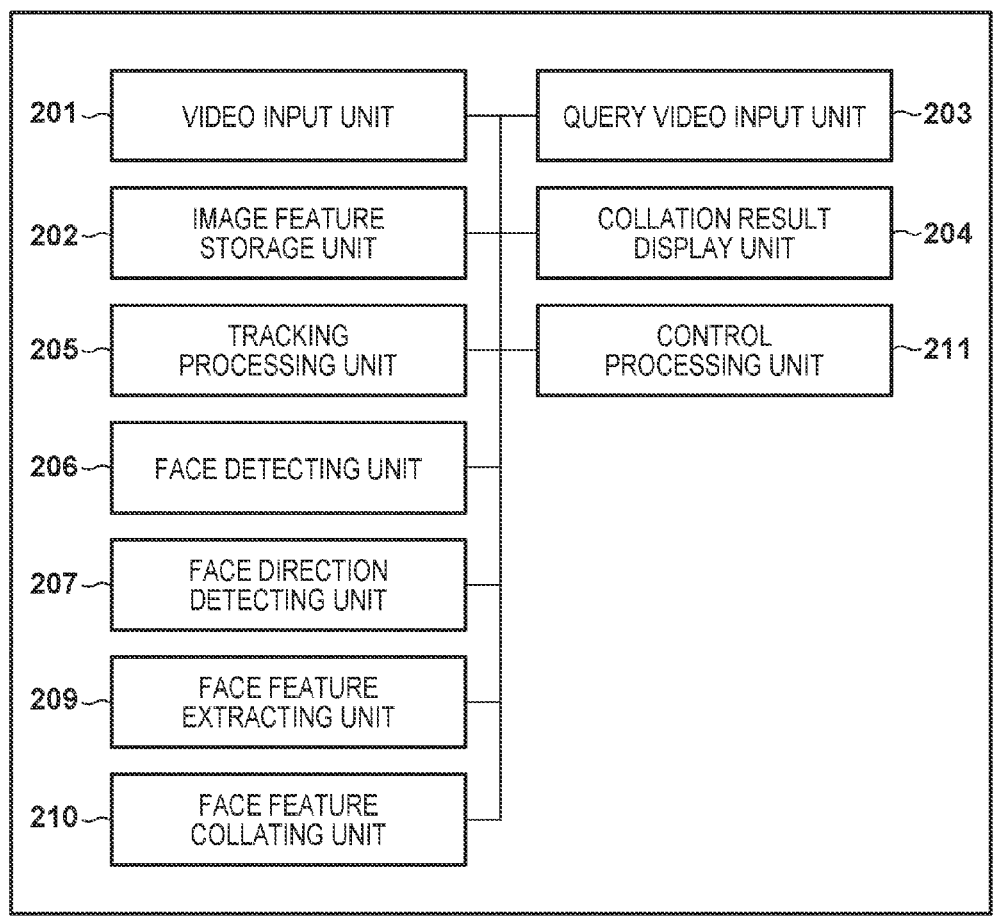
FIG. 2 is a functional block diagram of the apparatus according to the embodiment.

FIG. 2 is a functional block diagram of the video collation apparatus according to the embodiment. FIG. 2 is a functional block diagram in a case in which the CPU 101 executes the programs of both functions of the search server and the client.

In this embodiment, an example in which a face feature obtained from a face is used as an image feature, and image feature collation is performed using this image feature will be described.

A control processing unit 211 performs main processing for controlling processing units denoted by reference numerals 201 to 207, 209, and 210.

The video input unit 201 receives video frames from the network cameras 112a to 112c via the communication interface 107, and stores them in the external storage device 104. The input frame rate is assumed to be, for example, 30 frames/sec. As a result, the moving image files of the network cameras 112a to 112c are created in the external storage device 104. The video input unit 201 also supplies the received video frames to the face detecting unit 206.

The face detecting unit 206 performs face detection using the face direction detecting unit 207 and the face feature extracting unit 209. The face feature extracting unit 209 detects a face region in a video frame, extracts the feature amount, and returns it to the face detecting unit 206. In this embodiment, the SIFT (Scale Invariant Feature Transform) feature amount of a face organ point is obtained as a face feature amount. When extracting the face feature amount, the face feature extracting unit 209 also returns the coordinates of the upper left corner of the circumscribed rectangle of the face region and the size (a width W and a height H) of the circumscribed rectangle to the face detecting unit 206. Note that the coordinates of the lower right corner of the circumscribed rectangle may be returned in place of the size.

The face direction detecting unit 207 detects the direction of the face detected by the face detecting unit 206, and classifies the direction to one of preset direction patterns. The face direction detecting unit 207 returns a face direction pattern number as the classification result to the face detecting unit 206. Note that the technique of detecting the direction of a person face in an image is known, and a detailed description thereof will be omitted. Note that a literature concerning face direction detection is Erik Murphy-Chutorian, "Head pose estimation for driver assistance systems: A robust algorithm and experimental evaluation", in Proc. IEEE Conf. Intelligent Transportation Systems, 2007, pp. 709-714.

Figures 3A, 3B:
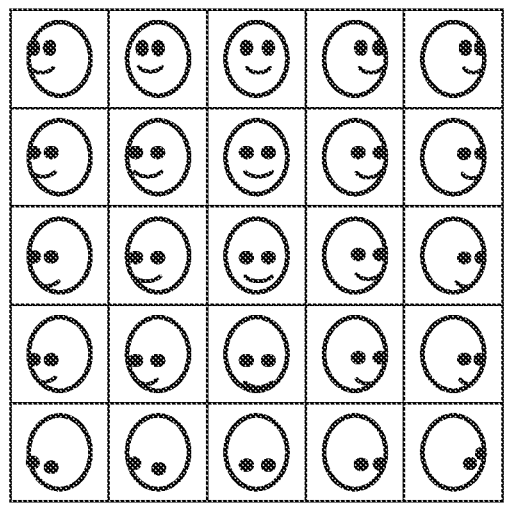
FIGS. 3A and 3B are views for explaining classification based on a face direction according to the embodiment.

The face direction detecting unit 207 according to this embodiment determines which one of 5×5 patterns shown in FIG. 3A corresponds to the direction of the face of interest. Note that although 5×5 patterns are shown in FIG. 3A, the number of patterns is not particularly limited. If each network camera has a sufficiently high resolution, the accuracy of a feature amount or direction becomes high. Hence, the number of patterns may be increased. In the illustrated patterns, the pattern of the face that looks front is located at the center. The larger the deviation angle in the vertical and horizontal directions is, the longer the distance from the center is. In other words, the face direction patterns are arranged such that the face looks front as its position becomes close to the center of the 5×5 patterns. In face collation, a high accuracy is obtained when the face that looks front is used. That is, the priority is highest for the face direction at the center of the 5×5 patterns, and lowers as the distance from the center increases. FIG. 3B shows an example of face direction pattern numbers. As shown in FIG. 3B, the face direction pattern number of the face that looks front is "1". Face direction pattern numbers 2 to 9 are assigned around it, and face direction pattern numbers 10 to 25 are assigned outside the numbers. Note that face direction pattern numbers 2 to 9 need not always be as illustrated. This also applies to face direction pattern numbers 10 to 25.

As described above, the face detecting unit 206 obtains the position, size, feature amount, and face direction pattern number of a person face from each video frame received from the network cameras 112a to 112c using the face direction detecting unit 207 and the face feature extracting unit 209.

Upon receiving tracking start instruction information from the control processing unit 211, the tracking processing unit 205 sets a designated face in the current frame as a tracking start target face, and performs tracking processing of the corresponding face in subsequent frame images. The tracking start instruction information includes information (camera ID) representing the network camera as the source of the frame image, information representing the initial position of the tracking target face, and an object ID used to specify the face to be tracked. Although details will become apparent from a description later, the tracking start instruction information also includes a tracking count and information (one of Tp1 and Tp2 in this embodiment) representing the timing of an end frame. The initial value of the object ID is 1. The value is incremented by "1" every time a face to be tracked is found. Note that a technique disclosed in Japanese Patent Laid-Open No. 2002-373332 is used to do the processing of tracking a person in an image.

Figure 4:
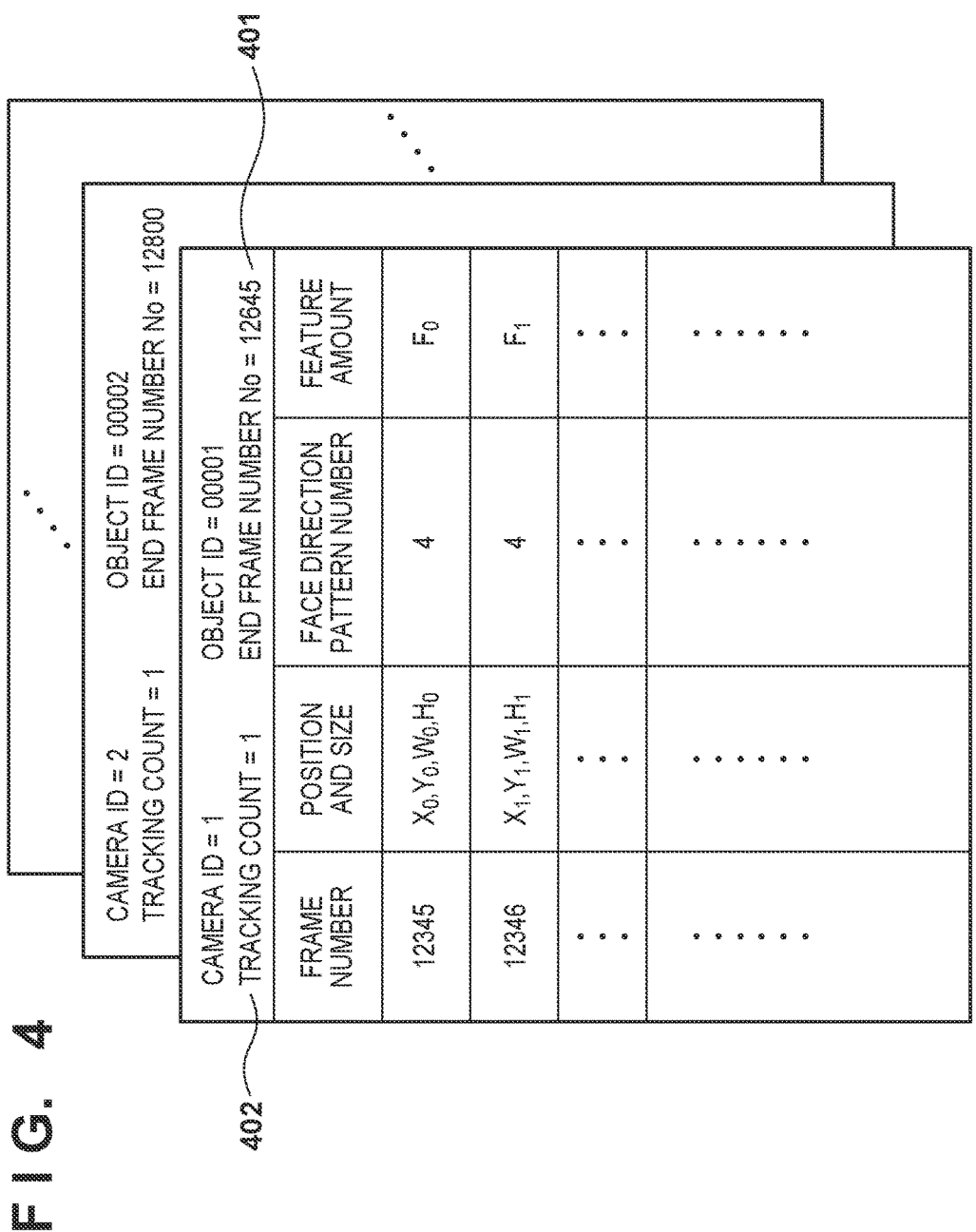
FIG. 4 is a view showing the contents of object tracking information according to the embodiment.

Upon receiving the tracking start instruction information, the tracking processing unit 205 generates object tracking information as shown in FIG. 4 on the RAM 103. One piece of object tracking information is specified by a camera ID and an object ID. The data of a tracking count and a final frame number are set for one piece of object tracking information. A detailed description of these data will be made later but will be omitted here.

Information stored in the object tracking information includes the frame number (or time) when the apparatus is instructed to start tracking after the start of imaging recording of the day. In addition, the position of the upper left corner of the circumscribed rectangle of the tracking target face in the corresponding video frame, and the size (the width and the height), the face direction pattern number, and the feature amount of the face are included. As these pieces of information, pieces of information from the face direction detecting unit 207 and the face feature extracting unit 209 are used.

As long as a video frame is sequentially input, and tracking of the corresponding face is succeeding, the tracking processing unit 205 adds the frame number, the position, the size, the face direction pattern number, and the feature amount described above to the corresponding object tracking information. If the face becomes untrackable, the tracking processing unit 205 requests the control processing unit 211 to register the corresponding object ID in the collation DB. Note that the face becomes untrackable in a case in which the face cannot be recognized because (the face of) the person under the tracking moves out of the field of vision of the camera, or the person looks back.

Upon receiving the registration request, the control processing unit 211 transfers the corresponding object tracking information to the image feature storage unit 202 and causes it to perform storage processing (registration processing) in the collation DB. Details of the image feature storage unit 202 will be described later. When the registration processing ends, the control processing unit 211 erases the registered object tracking information from the RAM 103.

Note that the person who has moved out of the field of vision of the camera may move into the field of vision of the camera again. The apparatus of the embodiment does not determine whether the person who has moved out of the field of vision of the camera and the person who has moved into the field of vision of the camera again are identical. For this reason, for the face of the person who has moved into the field of vision of the camera again, a new object ID is issued, and tracking starts. Hence, the tracking processing unit 205 eventually performs tracking processing for all objects recognized as faces in the imaging field of the camera. Hence, pieces of object tracking information shown in FIG. 4 are generated as many as the number of faces that are actually being tracked. About 40 to 50 face regions each having a size recognizable as a face exist at the most in the field of vision of one network camera. Even when the existence of three network cameras is taken into consideration, the number of tracking target faces is 150 at maximum. A current computer can sufficiently cope with the number of faces.

Figures 6, 7:
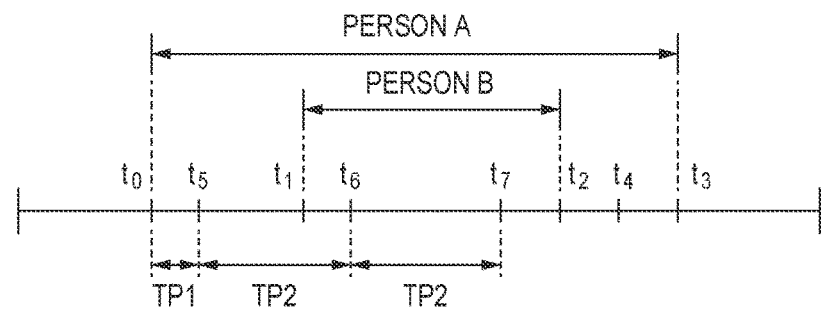
FIG. 6 is a view showing an example of timings of starting and ending object tracking according to the embodiment.
FIG. 7 is a view showing an example of the structure of a collation database according to the embodiment.

Assume that video frames from the network cameras are received, and the face of a person A is detected for the first time at time t0 in FIG. 6. In this case, an object ID is issued for the person A, and the object tracking information of the person A is generated. Tracking processing of the person A is performed up to time t3 at which the person A becomes untrackable. During this time, if the face of another person B is detected in the same imaging field for the first time at time t1, an object ID is issued for the person B, and the object tracking information of the person B is generated. Tracking processing of the person B is performed up to time t2 at which the person B becomes untrackable.

Storage processing of the image feature storage unit 202 will be described next with reference to FIG. 5. The storage processing is performed when the tracking processing of a certain person face ends, as already described.

Figure 5:
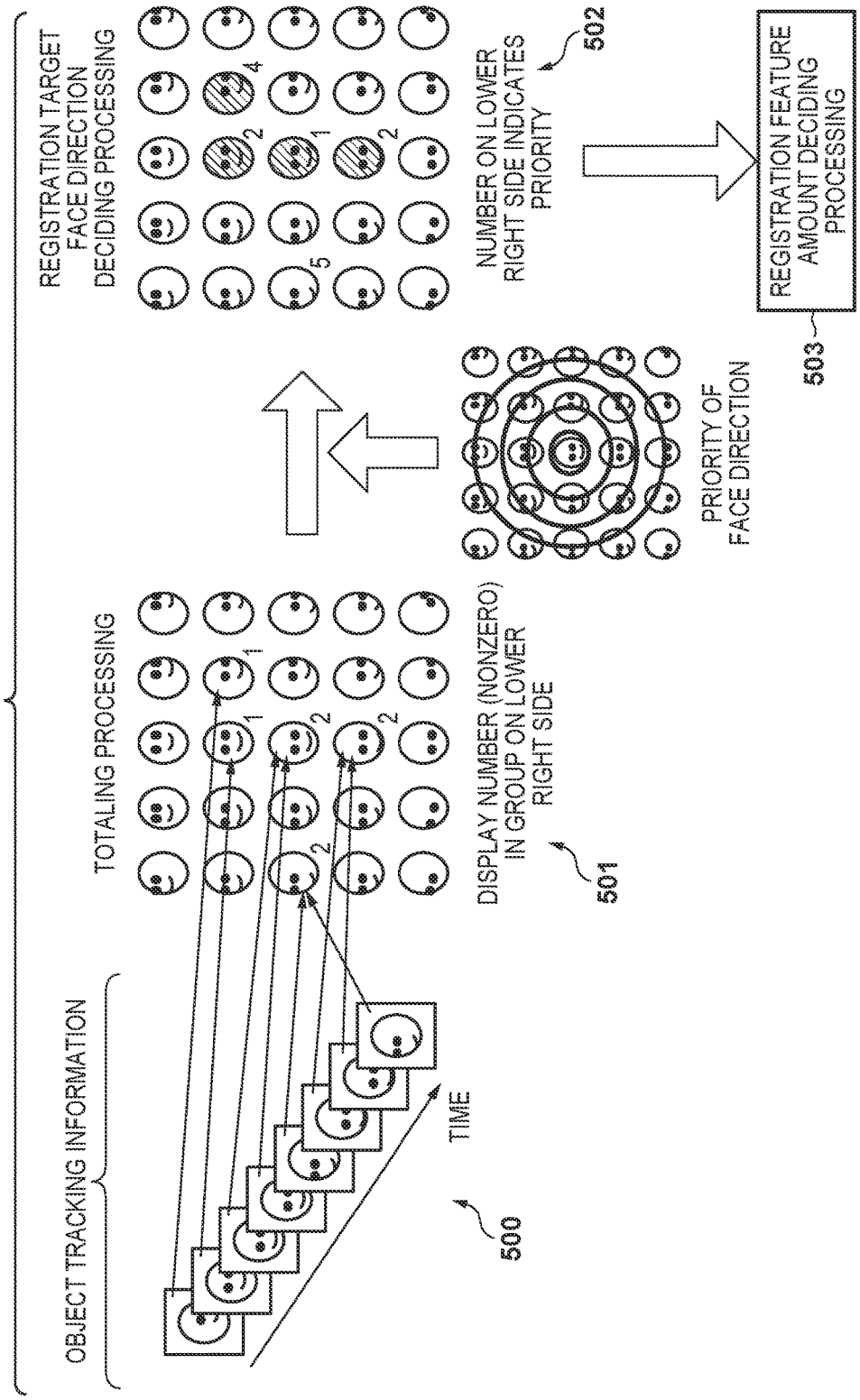
FIG. 5 is a view for explaining processing of an image feature storage unit according to the embodiment.

Reference numeral 500 in FIG. 5 denotes time transition of the face direction pattern number stored in object tracking information. Note that FIG. 5 shows an example in which a total of eight face direction patterns are stored in the object tracking information for the descriptive convenience.

First, the image feature storage unit 202 performs totaling processing of the appearance count of each face direction pattern number stored in the object tracking information. Reference numeral 501 in FIG. 5 denotes a totaling result. The number on the lower right side of each face pattern indicates the appearance count (cumulative number).

As shown in FIG. 3B, the face direction pattern numbers are 1 to 25. Hence, the totaling result of face direction IDs is expressed as a variable F (face direction pattern number). In this embodiment, four feature amounts are registered at maximum in the collation DB in correspondence with a tracking target face. This number is merely an example, as a matter of course, and more feature amounts may be registered.

In this embodiment, the priorities of the face direction pattern numbers are set in the order of number (see FIG. 3B). The image feature storage unit 202 arranges the totaled variables F(1) to F(25) in this order, and finds first four patterns whose appearance counts are nonzero (1 or more). In FIG. 5, as indicated by reference numeral 502, the hatched patterns F(1), F(2), F(3), and F(6) correspond to these patterns. That is, feature amounts of face direction pattern numbers=1, 2, 3, and 6 in the object tracking information are decided as registration candidates for the collation DB.

Here, the appearance count F(1) of face direction pattern number "1" is "1". That is, only one feature amount of face direction pattern number "1" exists in the object tracking information. For this reason, the image feature storage unit 202 registers, in the collation DB, the feature amount of face direction pattern number "1" in the object tracking information.

Since the appearance count F(2) of face direction pattern number "2" is "2", one of the feature amounts is decided to be registered. In this embodiment, the feature amount of one of the two faces with a larger size is registered as the feature amount representing the corresponding direction. If the face size is large, the distance from the camera upon capturing the face of the person is short, and a high accuracy can be expected. This also applies to face direction pattern numbers=3 and 6.

As a result, in this embodiment, four face feature amounts are registered in the collation DB in correspondence with one object ID. In addition, the possibility that a face feature amount is registered can be made high if the face direction does not repeat, and the degree of front looking of the face is high. Hence, the collation DB can be prevented from becoming bulky. In addition, as the face size becomes larger, the priority of the feature amount to be registered becomes higher, and accurate matching processing can be expected.

One problem remains. This problem arises because the timing of registering the face feature amount in the collation DB is set to the timing at which the face (person) becomes untrackable. For example, consider a case in which the current time is time t4 in FIG. 6, and the face of the person A who is a missing child is input as a query image. In this case, any one of the network cameras is capturing the face of the person A at the current time (time t4). However, the face is still under the tracking, and the feature amount of the face of the person A is not registered in the collation DB yet. That is, even if the feature amount of the face of the person A is input as a query image, and collation processing is started at the time t4, the face of the person A during the latest time from the time t0 to t4 cannot be the search target. When searching for a person such as a missing child, it is important to specify a location closest to the latest time. Hence, this problem cannot be neglected.

Considering the above problem, as a characteristic feature of this embodiment, not only the timing at which the face becomes untrackable but also a time limit is set as the timing of registering the face feature amount in the collation DB. For example, in FIG. 6, at time t5 after the elapse of the preset time Tp1 from the time t0 at which the tracking of the person A has started, registration processing of the feature amount of the face of the person A in the collation DB is performed even if it is still possible to detect the face of the person A. As a result, since the registration processing of the feature amount of the face of the person A in the collation DB is started in the early stage via the tracking processing, the person A can be set to the search target when the collation processing starts at the time t4. The time t4 is an example. If the feature amount of the face of the person A is registered in the collation DB after the time t5, the person A can be set to the search target.

In this embodiment, the number of face feature amounts of one object to be registered in the collation DB is four. However, the number of candidates before decision of feature amounts to be registered is preferably larger. This is because the probability of updating the largest size of an appearing face in each face direction becomes high. Hence, after the registration in the collation DB has been done in the first time Tp1, the time until the registration processing in the collation DB starts for the second or subsequent time is preferably longer than the time Tp1. This will be described with reference to FIG. 6. The first registration processing of the person A in the collation DB starts at the time t5 after the elapse of the time Tp1 from the tracking start time t0 of the person A. Let Tp2 be the time until the second or subsequent registration processing in the collation DB is performed for the same person A. In this embodiment, a relationship given by Tp2≥Tp1 holds. More specifically, Tp1 is about 10 sec, and Tp2 is about 20 sec. These values may appropriately be set, or the same value may be set. Tp1 is made shorter to hold Tp2≥Tp1 because the time until the face feature amounts of the object are registered in the DB for the first time needs to be shortened to early set the person to the search target.

Note that each object ID needs to be unique. In this embodiment, even if the same person A is being tracked, different object IDs are assigned from the time t0 to t5 (first tracking), from the time t5 to t6 (second continuous tracking), and from the time t6 to t7 (third continuous tracking).

The time after the elapse of the time Tp1 or Tp1+Tp2×n (n=1, 2 . . . ) for the tracking start time changes between objects. Whether tracking processing is the first tracking or the second or subsequent tracking needs to be identifiable.

For the above-described reasons, the tracking processing unit 205 according to the embodiment sets "1" to the tracking count denoted by reference numeral 402 in the object tracking information shown in FIG. 4 to indicate that it is the first tracking after person detection. This time can be specified by the first frame number when object tracking information is newly created. For example, in the example of FIG. 4, the first frame number when creating object tracking information of camera ID=1 and object ID=00001 is "12345". Assume that each of the network cameras 112a to 112c captures images at a frame rate of 30 frames/sec. If Tp1=10 sec, 300 frames are captured during this time. That is, the time t5 of registration in the collation DB is "12645" (=12345+300). Hence, when newly creating object tracking information, the tracking processing unit 205 sets "12645" to an end frame number denoted by reference numeral 401. The above-described processing is performed by the tracking processing unit 205 in accordance with tracking start instruction information set by the control processing unit 211.

As described above, the tracking processing unit 205 tracks the target frame, and adds a record including a frame number, a position and size, a face direction pattern number, and feature amounts to the object tracking information. If the face under the tracking becomes untrackable because the person moves out of the field of vision or looks back, the tracking processing unit 205 transmits (issues) a registration request to the collation DB including the corresponding object ID as an argument to the control processing unit 211.

If the current frame number reaches the end frame number 401 during the tracking processing, the tracking processing unit 205 transmits a registration request including the corresponding object ID and information representing that the current frame number has reached the end frame number to the control processing unit 211.

In the latter case, that is, if the current frame number has reached the end frame number 401, the control processing unit 211 can detect that continuous tracking is being performed, and therefore notifies the tracking processing unit 205 of tracking start instruction information including a new object ID and "Tp2" (because of continuous tracking) used to define the timing of the end frame. As a result, the tracking processing unit 205 creates object tracking information for continuous tracking and continues the tracking of the corresponding face.

FIG. 7 shows an example of the structure of the collation DB according to this embodiment. The collation DB is allocated in the external storage device 104. As shown in FIG. 7, one record of the collation DB is formed from fields to store an object ID, feature amounts (four feature amounts at maximum in this embodiment), a camera ID, the first frame number (time) of a period in which the face of the registered face feature amounts is detected, coordinates, and a face size. Out of these data, the feature amounts are used as keys in a search.

Figure 8:
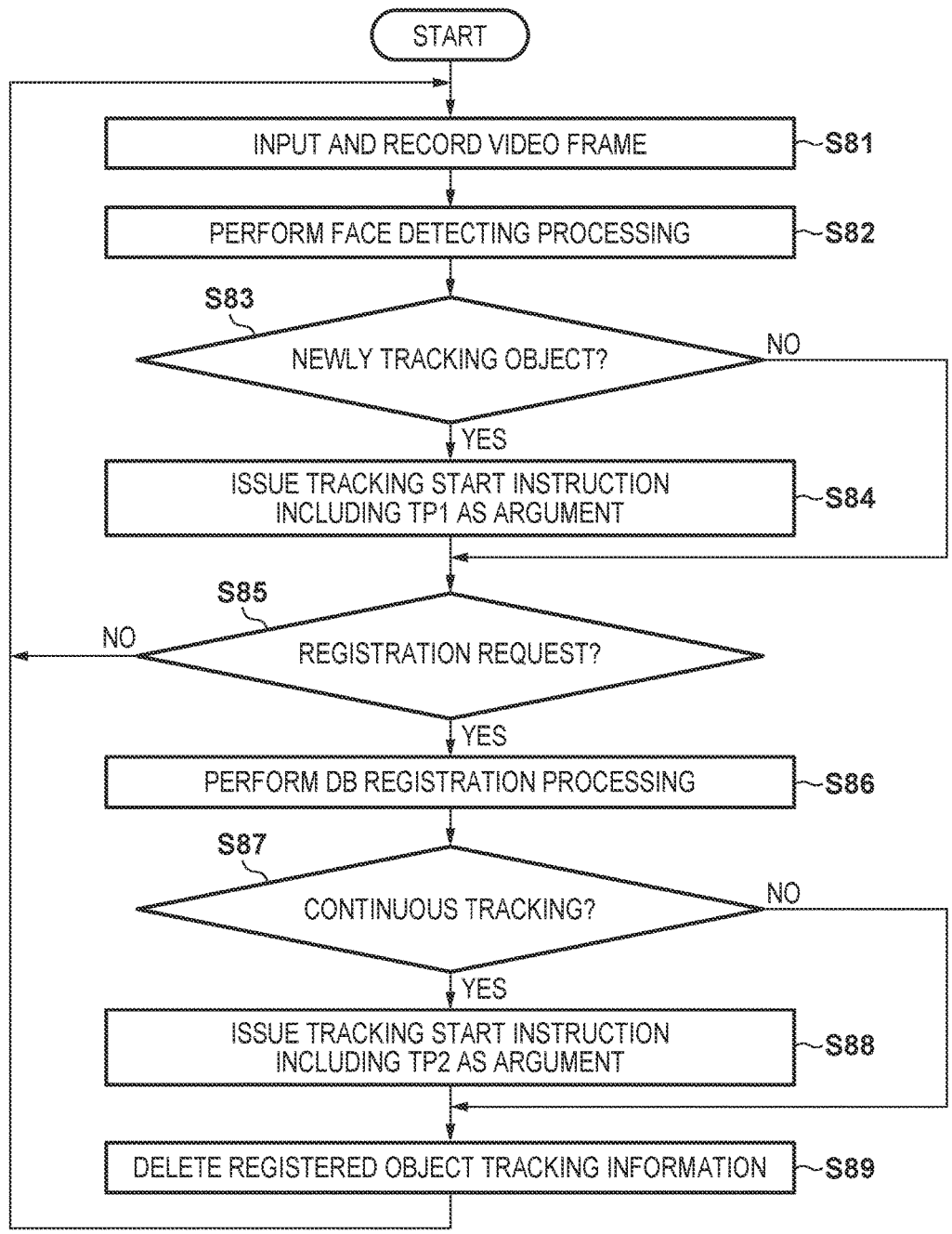
FIG. 8 is a flowchart showing video storage processing according to the first embodiment.

Based on the above explanation, main processing of video recording according to this embodiment will be described next with reference to the flowchart of FIG. 8. This processing is performed by the control processing unit 211.

In step S81, the control processing unit 211 receives video frames from the network cameras 112a to 112c via the communication interface 107, and records them in the external storage device 104 as moving image files of a collation target. The file names of the three moving image files created at this time are created by adding, for example, the camera IDs.

Next, the control processing unit 211 transfers the current video frame to the face detecting unit 206. In step S82, the control processing unit 211 causes the face detecting unit 206 to execute face detecting processing. As a result, the detection result of each face existing in the video frame can be obtained. In step S83, the control processing unit 211 determines, based on the detection result of the current video frame and the detection result of the immediately preceding video frame, whether an untracked face exists in the current video frame. If an untracked face exists, the process advances to step S84. In step S84, the control processing unit 211 transmits tracking start instruction information including a position at which the face to be newly tracked exists, the size of the face, a new object ID, a camera ID, a frame number, a tracking count "1", and the time "Tp1" used to define the end frame as arguments to the tracking processing unit 205. As a result, the tracking processing unit 205 creates object tracking information as shown in FIG. 4, and performs tracking processing of the face.

On the other hand, in step S85, the control processing unit 211 determines whether a registration request is received from the tracking processing unit 205. If a registration request is received, the control processing unit 211 advances the process to step S86, transfers the object tracking information of the registration request to the image feature storage unit 202, and causes it to perform registration processing in the collation DB. In step S87, the control processing unit 211 determines whether the registration request received in step S86 includes information representing that the current frame number has reached the end frame number 401, in other words, whether the registration request is issued because the person is untrackable. Upon determining that the registration request is issued because the person is untrackable, the control processing unit 211 deletes the object tracking information registered in the collation DB in step S89, and performs the processing from step S81.

If the registration request is issued because the current frame number reaches the end frame number 401, in step S88, the control processing unit 211 transmits tracking start instruction information including a new object ID and Tp2 to the tracking processing unit 205. As a result, the tracking processing unit 205 performs continuous tracking processing. The next longest tracking time is the timing set by the Tp2. The control processing unit 211 then performs the processing of step S89.

Figure 9:
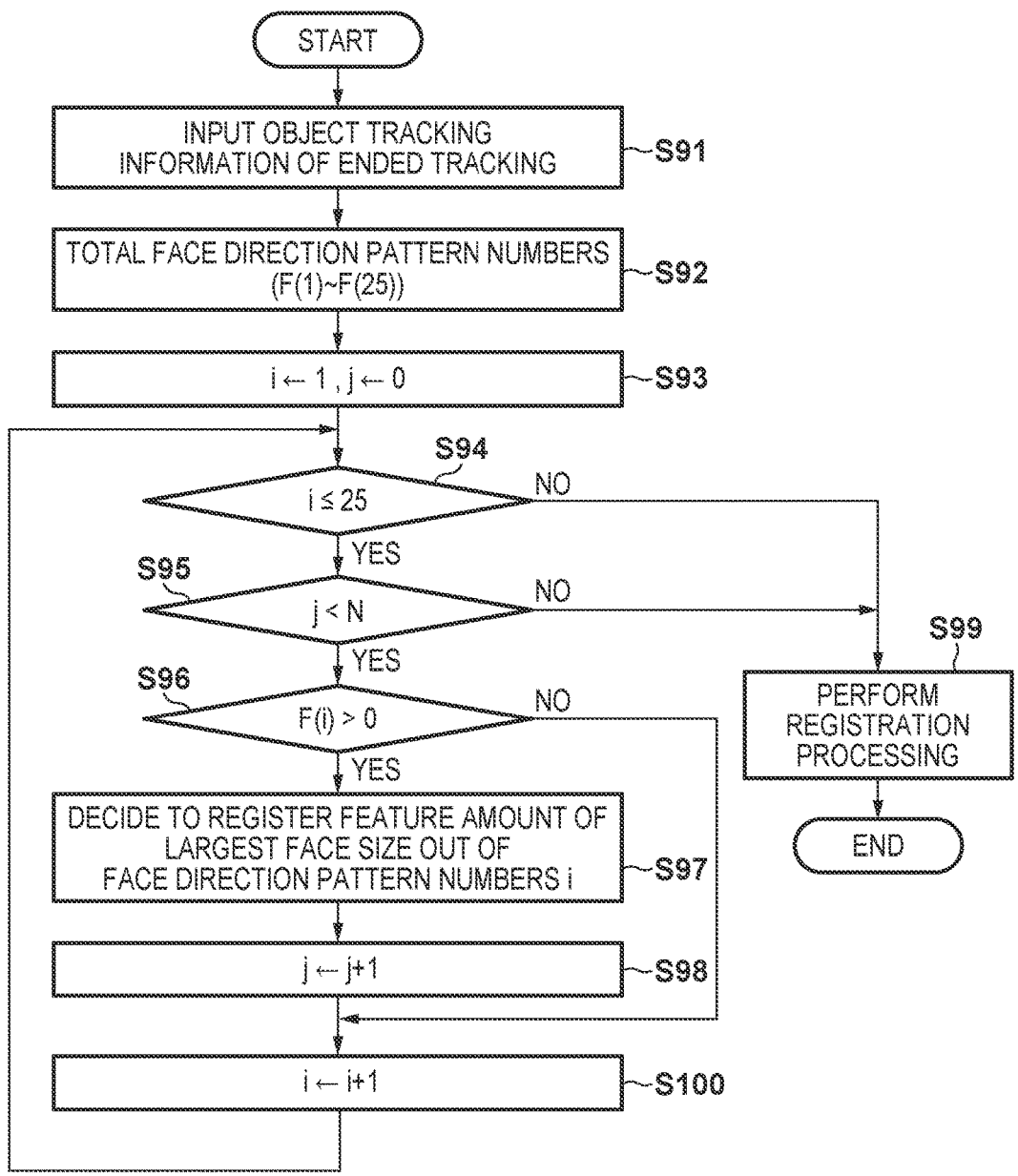
FIG. 9 is a flowchart showing DB registration processing in FIG. 8.

The DB registration processing (the processing of the image feature storage unit 202) of step S86 will be described next with reference to the flowchart of FIG. 9.

In step S91, the image feature storage unit 202 receives object tracking information from the control processing unit 211. The image feature storage unit 202 analyzes the received object tracking information, and performs totaling processing of each face direction pattern number. That is, the image feature storage unit 202 obtains the appearance counts F(1) to F(25) of face direction pattern numbers 1 to 25.

In step S93, the image feature storage unit 202 initializes a variable i to 1. The image feature storage unit 202 advances the process to step S94, and determines whether the variable i is 25 or less, that is, whether check of all appearance counts is completed. If the variable i is 25 or less (the check is incomplete), the image feature storage unit 202 initializes the variable i to 1 and a variable j to 0 in step S93. The variable i is a variable used to specify the appearance count F( ), and the variable j is a variable used to count the number of feature amounts to be registered.

In step S94, the image feature storage unit 202 compares the variable i with 25. If the variable i is 25 or less, all appearance counts F( ) are not checked. Hence, the image feature storage unit 202 advances the process to step S95 to compare the variable j with the preset upper limit number N of feature amounts (N=4 in this embodiments) to be registered in the collation DB. If j<N, the number of feature amounts to be registered in the collation DB has not reached the upper limit number N. Hence, the image feature storage unit 202 advances the process to step S96. In step S96, the image feature storage unit 202 determines whether the appearance count F(i) of a face direction pattern number i is nonzero (1 or more). If the appearance count F(i) is nonzero, in step S97, the image feature storage unit 202 decides the feature amount of the largest face size in face direction pattern number=i as a registration target for the collation DB. Since one registration target is decided, the image feature storage unit 202 performs processing of incrementing the variable j by one in step S98. Then, the image feature storage unit 202 performs a process of incrementing the variable i by 1 in step S100, and the returns the process to step S94.

If one of the determination results of steps S94 and S95 is NO, the image feature storage unit 202 advances the process to step S99. In step S99, the image feature storage unit 202 registers the feature amount decided as a registration target in the collation DB together with the object ID, the frame number, the camera ID, the position, and the size information, and ends the processing. Note that the variable i may be 25 before the variable j reaches N. In this case, the number of feature amounts to be registered is smaller than 4.

Figure 10:
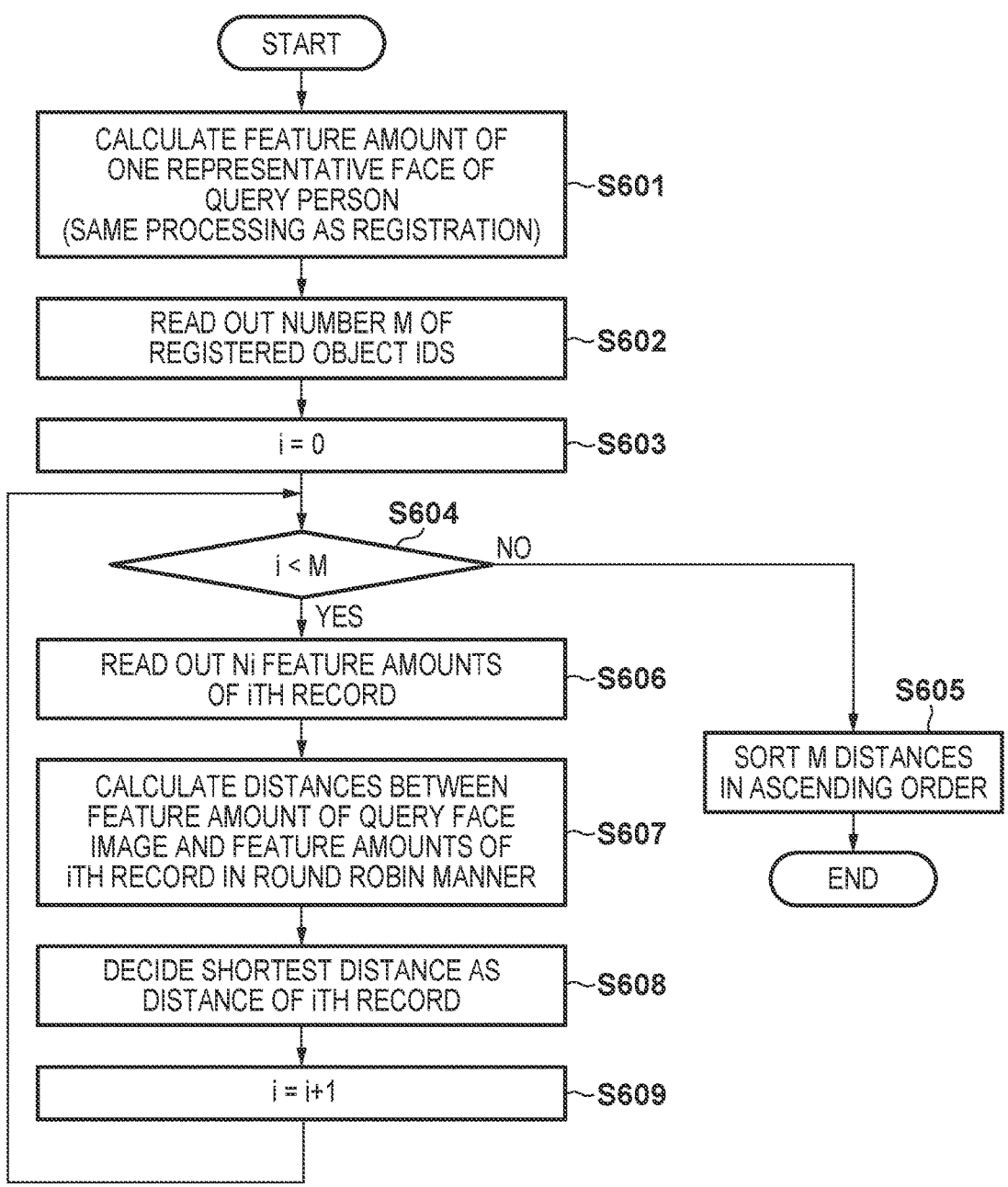
FIG. 10 is a flowchart showing collation processing according to the first embodiment.

Video data and feature amount registration processing according to this embodiment has been described above. Collation processing according to this embodiment will be described next. Collation processing is implemented by the query video input unit 203, the face detecting unit 206, the face feature collating unit 210, the collation result display unit 204, and the control processing unit 211 that controls these units. Collation processing will be described below with reference to the flowchart of FIG. 10.

In step S601, the control processing unit 211 instructs the query video input unit 203 to input a query video. The input source of the query video is not particularly limited. For example, a portable terminal held by a search client may be connected to the apparatus, and an image in which the face of a person to be searched for is captured may be transferred to the apparatus as a query video. Note that if the apparatus is connected to the Internet, the query video may be received as mail. At any rate, when the query video is input, processing of specifying the face of the query person is performed. For example, the face direction detecting unit 207 detects all faces existing in the query video, adds rectangular frames to the detected faces, and displays the faces on a display device to make the search client select one of them as a search target face image (query face image). Note that if only one face is detected, the face may be handled as an unconditionally selected face. When the query face image is decided, a feature amount extracted when the query face image is detected is decided as a detection key.

In step S602, the control processing unit 211 obtains the total number M of object IDs (the number of records) registered in the collation DB. The control processing unit 211 requests the face feature collating unit 210 to do collation processing using the acquired number M and the feature amount of the query face image as arguments.

In step S603, the face feature collating unit 210 initializes the variable i to 0. In step S604, it is determined whether the variable i is equal to or less than M. If i<M, collation of all records is incomplete. Hence, the process advances to step S606. In step S606, the face feature collating unit 210 reads out the ith record of the collation DB, and reads out Ni feature amounts stored in the record. In this embodiment, Ni is 4 at maximum, as already described. The distance between the feature amount of the query face image and each of the Ni feature amounts is calculated, and the shortest distance is decided as the distance between the query face image and the person face of the object ID of the ith record. The face feature collating unit 210 stores the pair of the object ID and the decided distance in a predetermined area of the RAM 103. After that, to perform collation processing with the next record, the variable i is incremented by "1", and the process returns to step S604.

The above-described processing is repeated. When comparison processing with all records ends (when it is determined that variable i=M), distances to all registered object IDs are stored in the RAM 103. In step S605, the face feature collating unit 210 sorts the distances stored in the RAM 103 in ascending order, and ends the processing.

As processing after that, the control processing unit 211 transfers the collation result to the collation result display unit 204, thereby performing collation result display processing. As for how to display, for example, a list of a predetermined number of face images arranged in ascending order of distance is displayed. When one of the face images is selected, processing of, for example, reproducing the moving image from a corresponding position is performed based on the frame number and the camera ID corresponding to the face.

Note that in the above-described embodiment, if a plurality of identical face direction pattern numbers exist in one piece of object tracking information, the feature amount of the largest face size is decided as the registration target. However, the registration target may be decided in consideration of a condition other than the size or a condition addition to the size as the feature amount. For example, a feature amount in a video frame whose degree of blur is small may preferentially be registered, or a face with a closed eye or an open mouth may be registered with low priority.

The shutter speed may change depending on brightness on the site even in a camera for capturing a moving image, as in a camera for a still image. Hence, the face image may be blurred in a dark place or because of the moving speed of the object. This directly causes degradation in an image feature amount or attribute information. To estimate the blur, frequency components in the face image region are obtained, and the ratio of the low frequency component and the high frequency component is obtained. If the ratio of the low-frequency component exceeds a predetermined value, it can be determined that a blur has occurred. Additionally, if a closed eye or an open mouth exists, the image feature amount of the organ deteriorates. In some cases, an error occurs in the attribute information as well.

Furthermore, when deciding the feature amount of the registration target using a plurality of parameters such as the size, closed eye, and blur, a space having coordinate axes corresponding to the parameter types is assumed, and a distance in the coordinate space is obtained.

Face direction pattern numbers 2 to 9 are arranged to surround the center position and can therefore be regarded as the same level. Hence, if a plurality of patterns whose totaling results are nonzero exist among face direction pattern numbers 2 to 9, deciding the feature amount of the largest size is repeated until the number reaches the number of feature amounts (four in this embodiment) to be registered. However, one feature amount is registered at maximum for one face direction pattern number, as described above. This also applies to face direction pattern numbers 10 to 25.

As described above, according to this embodiment, when a predetermined time (Tp1 in this embodiment) elapses from detection of a face to be tracked, a face feature amount detected during this period is registered in the collation DB. Hence, when Tp1 is set to several to ten-odd sec, a person close to the current time can substantially be set to the collation target.

According to the embodiment, the feature amounts of faces whose directions are different from each other can be registered in the collation DB in correspondence with one object ID. That is, since the feature amounts of faces in the same direction are not repetitively registered, the collation DB can be prevented from unnecessarily becoming bulky. Additionally, in the embodiment, a high priority is given to a face that looks front, and a predetermined number of feature amounts are registered in the collation DB in the priority order. This makes it possible to further prevent the collation DB from becoming bulky and register accurate feature amounts. Even if the face direction is the same, a feature amount that can be expected to have a high accuracy for a condition such as a face size is registered. Hence, the collation accuracy can also be made high.

Note that in the embodiment, the tracking processing unit 205 tracks a tracking target face, and adds the feature amount and direction of the face to the object tracking information during that time. However, in face detection, it is only necessary to determine whether an object is a human face or not. Hence, simple face detection may be performed, and a more accurate feature amount or face direction to be registered in the collation DB may be calculated after the end of the tracking.

In the embodiment, the number of feature amounts registered in correspondence with one face direction is one. If the DB is allowed to be slightly bulky, the number may be set to a predetermined number or less. In this case, the predetermined number may be set by the user (an administrator appropriately sets the number).

Note that in the embodiment, an example in which a face feature obtained from a face is used as an image feature, and image feature collation is performed using the face feature has been described. However, an image feature obtained from a head region wider than a face or a whole body region up to the toes may be used. For example, a Local Binary Pattern (LBP) feature amount or a Histogram of Oriented Gradients (HOG) feature amount is extracted from the head region or the whole body region and used.

In the embodiment, a face detected by the face detecting unit 206 is tracked by the tracking processing unit 205. However, as described in Japanese Patent Laid-Open No. 2002-373332, an object may be detected from a motion vector, a search position in the next frame may be estimated, and person tracking may be performed by template matching. In this case, a face is detected from the position of the tracked person, and if a face is detected, processing of classifying it by face direction is performed. If no face is detected, the image in which no face is detected may be classified into a group. As described above, this embodiment can widely be applied to a form in which when detecting the whole body or a part of a person and tracking the detected whole human body or part, a feature amount extracted from the whole body or part of the person is registered. In the embodiment, an example in which the faces are classified by face direction and registered in the collation DB has been described. However, the faces may be classified by, for example, facial expression (a smiling face, a tearful face, and the like). That is, the embodiment can widely be applied to an arrangement that classifies faces extracted from an input video into predetermined groups (face direction or facial expression) and registers.

Second Embodiment

In the first embodiment, as shown in FIG. 6, even if the tracking processing unit 205 tracks the person A during the period from the time t0 to t3, independent object IDs are registered in the DB from the time t0 to t5, from the time t5 to t6, and from the time t6 to t7. In the second embodiment, an example in which one common object ID is used in the section from time t0 to t3 will be described. More specifically, object tracking information created by a tracking processing unit 205 at the time t0 is continuously used at times t5 and t6.

The processes of a control processing unit 211 and an image feature storage unit 202 are different from the first embodiment. Points different from the first embodiment will be described below.

The control processing unit 211 does not execute step S89 only when continuous tracking is being performed. In other words, the control processing unit 211 deletes registered object tracking information only when a person is untrackable. Additionally, in place of step S88, the control processing unit 211 performs processing of incrementing a tracking count 402 in the corresponding object tracking information by "1" and updating the end frame number to "current frame number+F×Tp2" (F is the frame rate of imaging by a video camera).

Upon receiving a registration request of object tracking information having the same ID as an object ID already registered in the collation DB, the image feature storage unit 202 performs processing by regarding the request as a request to update the registered feature amount of the corresponding object ID.

As a result, for example, at the time t5 shown in FIG. 6, the feature amount of a person A obtained by tracking processing in the section "t0-t5" is registered in the collation DB. Hence, as in the first embodiment, the feature amount in an early stage (a period corresponding to a time Tp1) at the start of tracking of the person A can be set to the collation target. At the time t6, the feature amount of the person A with the same object ID, which is obtained by tracking processing in the section "t0-t6", is updated. That is, as long as continuous tracking is performed, the number of feature amounts to be registered never increases. In addition, as the time elapses, the tracking interval becomes long. It is therefore possible to raise the reliability of the feature amount to be registered.

The first and second embodiments have been described above. In the embodiments, one feature amount is registered in the collation DB in correspondence with one face direction. However, the number of registrable feature amounts corresponding to one face direction may be set. In the embodiments, two types of times Tp1 and Tp2 are used in continuous tracking. However, the times may be changed in accordance with the tracking count.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-180116, filed Sep. 11, 2015, and No. 2016-144757, filed Jul. 22, 2016, which are hereby incorporated by reference herein in their entirety.

What is claimed is:

1. An information processing apparatus which extracts a feature amount of a person in frames received from at least one camera and registers the feature amount in a collation database so as to search for a person inputted as a query by referring to the collation database, comprising:
   one or more processors; and
   at least one memory coupled to the one or more processors, the at least one memory storing instructions which, when executed by the one or more processors, cause the information processing apparatus to:
      receive, via a communication interface for communicating with at least one camera, a frame sequentially from the camera as a current frame of a live video;
      detect a person from the current frame;
      if a new person is detected, set the new person as a target to be tracked;
      track, in the frames following the current frame, the person set as the target to be tracked until the person is not detected;
      extract a feature amount of the person from each frame during the tracking of the person;
      obtain an elapsed time from a start of the tracking of the person set as the target; and
      if the tracking of the person is ended, select a predetermined number of feature amounts among feature amounts extracted from frames received during the tracking of the person and register the selected feature amounts in the collation database; and
      if the elapsed time from the start of the tracking of the person reaches a first period though the tracking of the person is continued, select the predetermined number of feature amounts among the feature amounts extracted from frames received during the first period and register the selected feature amounts in the collation database,
   wherein the features amounts are registered by causing the information processing apparatus to:
      classify faces of the tracked persons into a plurality of predetermined groups on the basis of each of directions of the faces; and
      select, from the classified groups, faces in a number not more than the predetermined number, and
   wherein, in the collation database, the feature amounts of the selected faces are registered.

2. The information processing apparatus according to claim 1, wherein the person set as the target to be tracked is detected after the first period, in the collation database, the predetermined number of feature amounts among features amounts extracted from frames received during a second period after the end of the first period is registered if the tracking of the person is continued, and
wherein the first period is shorter than the second period.

3. The information processing apparatus according to claim 2, wherein in the collation database, the predetermined feature amounts among feature amounts extracted from frames every time the second period has elapsed are registered after the end of the first period if the tracking of the person is continued.

4. The information processing apparatus according to claim 1, wherein the instructions, when executed by the one or more processors, further cause the information processing apparatus to:
hold the feature amount extracted from the tracked person in the current frame so as to belong to a classified group.

5. The information processing apparatus according to claim 4, wherein the groups in the number not more than a first predetermined number are selected based on at least one of a size of the face, a blur, a closed eye, and an open mouth.

6. The information processing apparatus according to claim 4, wherein, from the plurality of predetermined groups, groups in a number not more than a second predetermined number are selected based on priorities, and feature amounts in the number not more than a first predetermined number for each of the selected groups are selected, and
wherein the priorities are set in advance for the plurality of groups.

7. The information processing apparatus according to claim 1, wherein the instructions, when executed by the one or more processors, further cause the information processing apparatus to:
input a query video; and
perform collation with the feature amounts registered in the collation database based on a feature amount of a person in the input query video.

8. A method of controlling an information processing apparatus which extracts a feature amount of a person in frames received from at least one camera and registers the feature amount in a collation database so as to search for a person inputted as a query by referring to the collation database, comprising:
receiving, via a communication interface for communicating with at least one camera, a frame sequentially from the camera as a current frame of a live digital image video;
detecting a person from the received current frame;
setting, if a new person is detected in the detecting, the new person as a target to be tracked;
tracking, in the frames following the current frame, the person set as the target to be tracked;
extracting a feature amount of the person from each frame during tracking the person;
obtaining an elapsed time from a start of the tracking of the person set as the target to be tracked;
selecting, if the tracking of the person is ended, a predetermined number of feature amounts among feature amounts extracted from frames received during tracking the person and registering the selected feature amounts in the collation database; and
selecting, if the elapsed time from the start of the tracking of the person reaches a first period while tracking the person continues, the predetermined number of feature amounts among the feature amounts extracted from frames received during the first period and registering the selected features amounts in the collation database,
wherein the features amounts are registered by:
classifying faces of the tracked persons into a plurality of predetermined groups on the basis of each of directions of the faces; and
selecting, from the classified groups, faces in a number not more than a first predetermined number, and
wherein, in the collation database, the feature amounts of the selected faces are registered.

9. A non-transitory computer-readable storage medium storing a computer program which causes a computer to executes steps of a method of controlling an information processing apparatus which extracts a feature amount of a person in frames received from at least one camera and registers the feature amount in a collation database so as to search for a person inputted as a query by referring to the collation database, the method comprising:
receiving, via a communication interface for communicating with at least one camera, a frame sequentially from the camera as a current frame of a live video;
detecting a person from the received current frame;
setting, if a new person is detected in the detecting, the new person as a target to be tracked;
tracking, in the frames following the current frame, the person set as the target to be tracked;
extracting a feature amount of the person from each frame during tracking the person;
obtaining an elapsed time from a start of the tracking of the person set as the target to be tracked;
selecting, if the tracking of the person is ended, a predetermined number of feature amounts among feature amounts extracted from frames received during tracking the person and registering the selected feature amounts in the collation database; and
selecting, if the elapsed time from the start of the tracking of the person reaches a first period while tracking the person continues, the predetermined number of feature amounts among the feature amounts extracted from frames received during the first period and registering the selected features amounts in the collation database,
wherein the features amounts are registered by:
classifying faces of the tracked persons into a plurality of predetermined groups on the basis of each of directions of the faces; and
selecting, from the classified groups, faces in a number not more than a first predetermined number, and
wherein, in the collation database, the feature amounts of the selected faces are registered.

10. An information processing apparatus which extracts a feature amount of a person in frames received from at least one camera and registers the feature amount in a collation database so as to search for a person inputted as a query by referring to the collation database, the information processing apparatus comprising:
one or more processors; and
at least one memory coupled to the one or more processors, the at least one memory storing instructions which, when executed by the one or more processors, cause the information processing apparatus to:
receive a frame sequentially from the camera as a video;
detect a person from the frame;
if a new person is detected, set the new person as a target to be tracked;
track, in the frames following the frame, the person set as the target to be tracked until the person is not detected;
extract a feature amount of the person set as the target to be tracked;

obtain an elapsed time from a start of the tracking of the person set as the target;

select, if the tracking of the person is ended a predetermined number of feature amounts among feature amounts extracted from frames received during tracking the person and register the selected feature amounts in the collation database; and select, if the elapsed time from the start of the tracking the person reaches a first period while tracking the person continues, the predetermined number of feature amounts among feature amounts extracted from frames received during the first period and register the selected features amounts in the collation database, wherein the feature amounts are registered by causing the information processing apparatus to:

classify faces of the tracked persons into a plurality of predetermined groups on the basis of each of directions of the faces; and select, from the classified groups, faces in a number not more than a first predetermined number, and wherein, in the collation database, the feature amounts of the selected faces are registered.

\* \* \* \* \*